No. 637,046. Patented Nov. 14, 1899.
E. TAYLOR.
JUNCTION OF FRAMES.
(Application filed Nov. 22, 1897.)
(No Model.)
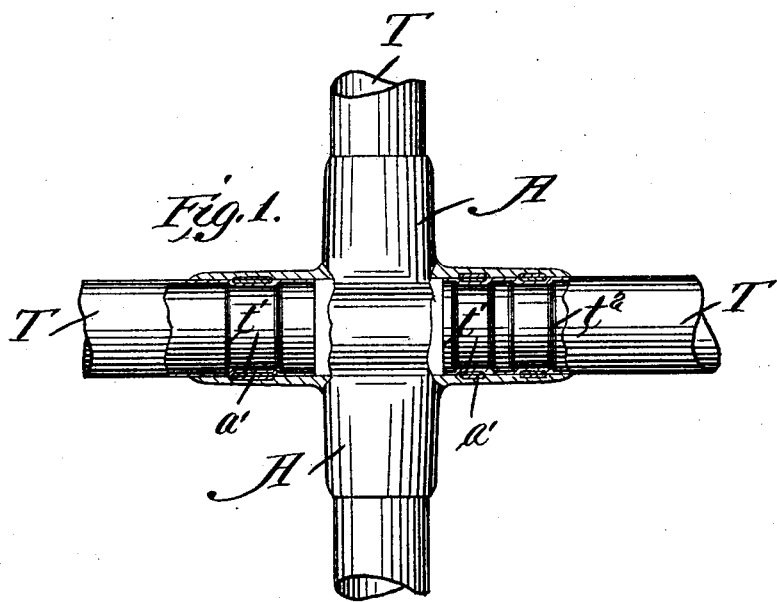
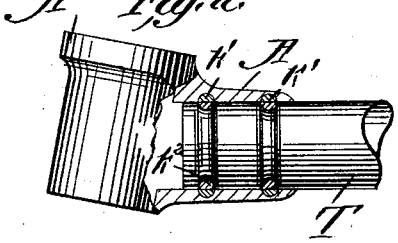
WITNESSES:
INVENTOR
Edwin Taylor
ATTORNEYS

UNITED STATES PATENT OFFICE.

EDWIN TAYLOR, OF BIRMINGHAM, ENGLAND.

JUNCTION OF FRAMES.

SPECIFICATION forming part of Letters Patent No. 637,046, dated November 14, 1899.

Application filed November 22, 1897. Serial No. 659,539. (No model.)

*To all whom it may concern:*

Be it known that I, EDWIN TAYLOR, stamper and piercer, a subject of the Queen of Great Britain, residing at 1 Alfred street, Warstone Lane, Birmingham, in the county of Warwick, England, have invented certain new and useful Improvements in the Junctions of Cycle, Motor-Car, and other Frames, Bedstead and Fender Junctions, and for other Purposes, of which the following is a specification.

This invention has been patented to me in England, August 30, 1897, No. 19,932.

My invention has for its object improvements in the junctions of cycle, motor-car, and other frames, bedstead and fender junctions, and for other purposes, so as to avoid brazing.

In order that my invention may be clearly understood and more easily carried into practical effect, I have appended hereunto drawings illustrating examples of the application of my invention to several junctions and articles which will be sufficient to enable others to apply the principle more widely to the various circumstances met with in practice. The junction-pieces and tubes may be of other sections instead of round.

Figure 1 is a cross-socket junction-piece A, with the tubes T applied and united thereto according to my invention. Fig. 2 is another example of a tube T, joined to the socket A. Fig. 3 shows a filling-in or sealing ring $k^2$ for placing upon the end of a tube. Fig. 4 is a ring $k'$ for placing in a socket, and Fig. 5 is a cross-section through the rings $k'$ and $k^2$.

In making my new junctions I turn or form in the interior of the socket A a recessed part or parts $a'$—that is, one, two, or more of such recesses. The end of the tube is also recessed with one or more corresponding recesses $t'$, which when the tube is thin is or are made by pressing portions of the tube inward, as shown, so as to retain the full thickness, or nearly the full thickness, of the tube at the recessed parts. I then put into the recess $t'$ in the tube T a ring, such as $k^2$, which is of suitable thickness to fill up the recess without projecting, and, if necessary, the ends of this ring may be soldered or otherwise connected together. Also in the recess A' of the socket I place a ring, such as $k'$; or instead of the ring or rings being loose in the recesses in the tube and socket they may be fixed, or the ring or rings may be formed without a joint and either cast into the groove or grooves or forced in by pressure, or the rings $k'$ and $k^2$ may be formed of a number of coils instead of a single coil. When this is done, the tube T is placed in the socket A until the rings are opposite to each other, as seen at Figs. 1 and 2, when a sufficient heat is applied to the junction to melt the easily-fusible rings K $k'$ $k^2$, so that the two rings $k'$ and $k^2$ become practically one ring and shrink tightly upon the tube T, sealing it into the socket and filling in any space near to the same, thus producing a tight junction of the tube T with the socket A. I may rough or indent the tube T slightly, so as to more securely secure the ring $k'$ upon it.

Fig. 2 only differs from Fig. 1 in regard to the cross-sectional shape of the rings $k'$ and $k^2$. As will be obvious, the cross-section may be greatly varied.

The melting of the rings may be effected by the application of heat externally or internally of the tubular parts or by placing the article or frame in a stove for the purpose.

The fusing-point of the metal or alloy is suited to the material for which the junction is being made. For instance, in uniting wood or glass the fusing-point would probably range between 100° and 400° Fahrenheit; but for the junctions of brass mounts or bedstead-fenders the fusing-point might be higher and for steel and iron higher still; but I always prefer to use a ring that will fuse before any injury is done, the special object being to do away with brazing, which is very injurious to steel tubes, which are often overheated during the brazing process.

Having now particularly described and ascertained the nature of my said invention and in what manner the same is to be performed, I declare that what I claim is—

A joint for tubular parts fitting one within the other comprising an annular unbroken groove in the surface of each, said grooves being in alinement and forming a completely-closed channel, and a metal filling in each groove, said metal filling being fusible at a temperature lower than the fusing-point of the tubular parts, substantially as described.

In testimony that I claim the foregoing as my own I affix my name in the presence of two witnesses.

EDWIN TAYLOR.

Witnesses:
GEORGE LESTER,
FREDERICK BUCKLEY.